April 12, 1955

E. H. PAUL 2,706,088

ROTARY CAKE BREAKER

Filed Jan. 16, 1952

INVENTOR.
Emil H. Paul
BY
Merchant & Merchant
ATTORNEYS

April 12, 1955     E. H. PAUL     2,706,088
ROTARY CAKE BREAKER
Filed Jan. 16, 1952     2 Sheets-Sheet 2
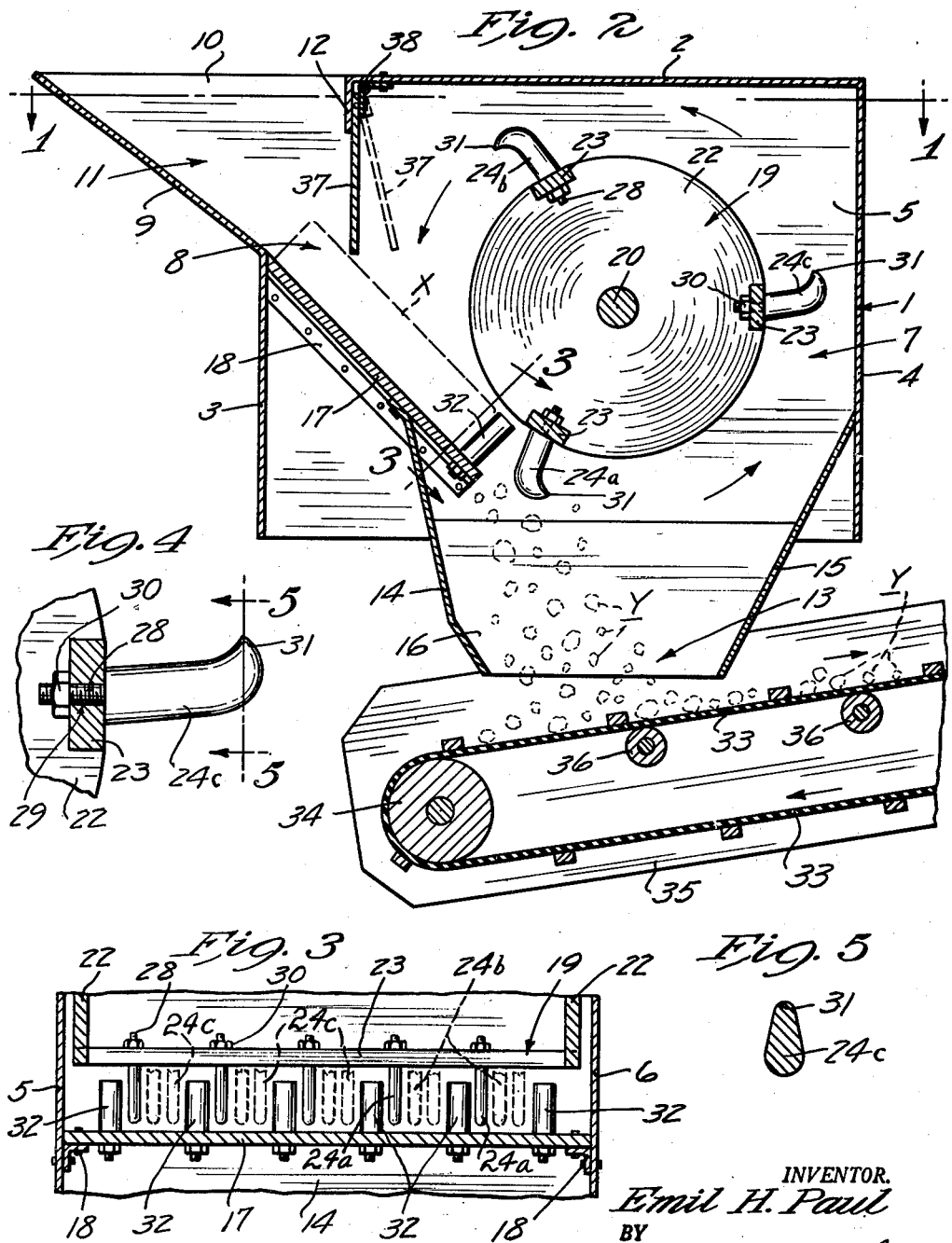
INVENTOR.
Emil H. Paul
BY
Merchant & Merchant
ATTORNEYS United States Patent Office 2,706,088
Patented Apr. 12, 1955

2,706,088

ROTARY CAKE BREAKER

Emil H. Paul, Tracy, Minn.

Application January 16, 1952, Serial No. 266,661

1 Claim. (Cl. 241—186)

My invention relates generally to machines for breaking of relatively large chunks of solid material into relatively small pieces and, more particularly, to machines utilized in the meat packing industry for the breaking up of compressed cakes or bricks of residual solids or cracklings from which lard or the like has been rendered.

As is well known to those skilled in the art, when lard is rendered, the cracklings are usually placed in a press and the lard extracted therefrom by squeezing under extreme pressure. During this process, the residue or cracklings, as such residue is commonly termed in the trade, are formed into a conglomerate mass or cake. These cakes are stored for future use in animal foods and other suitable purposes. Before the same can be utilized as feed or as a component part of a food product, the so-called cakes must be broken up into relatively small pieces or granules so that the same may be readily consumed. An important object of my invention is, therefore, the provision of mechanism for quickly and efficiently breaking the cakes, or bricks of cracklings into granules of a size to be consumed directly or further processed for consummation.

Another object of my invention is the provision of a machine, as set forth, having an inlet opening for the reception of cakes to be broken up, a tooth-equipped breaker rotor, a discharge opening for the delivery of granular particles or smaller chunks, and novel means for preventing discharge of said granular particles outwardly through the inlet opening.

A still further object of my invention is the provision of a machine, as set forth, which is relatively simple and inexpensive to manufacture, which is efficient in operation, and which is rugged in construction and durable in use.

Other highly important objects and advantages of my invention will become apparent from the following detailed specification, appended claim, and attached drawings.

Referring to the drawings, which illustrate the invention and in which like characters indicate like parts throughout the several views:

Fig. 2 is a vertical section taken substantially on the line 2—2 of Fig. 1;

Fig. 3 is a fragmentary sectional detail taken on the line 3—3 of Fig. 2;

Fig. 4 is an enlarged fragmentary section taken substantially on the line 4—4 of Fig. 1; and Fig. 5 is a view in section taken on the line 5—5 of Fig. 4.

Figure 1:
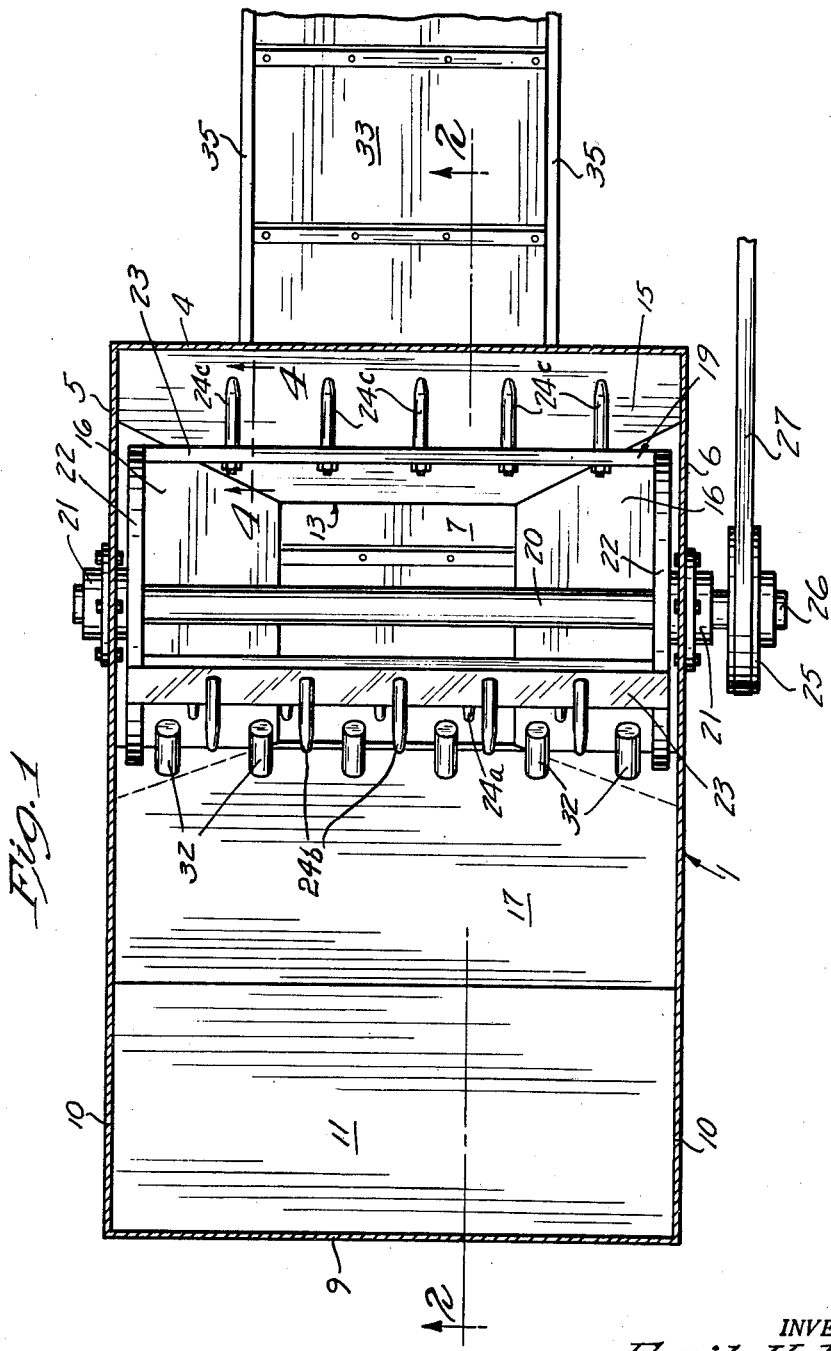
Fig. 1 is a view partly in plan and partly in horizontal section taken substantially on the line 1—1 of Fig. 2, some parts being omitted.

Referring with greater detail to the drawings, the numeral 1 indicates in its entirety a frame structure comprising a top wall 2, side walls 3 and 4, and end walls 5 and 6 which cooperate to define an enclosed chamber 7 having an inlet 8 at one side thereof adjacent its upper end. The side wall 3 is formed to provide an inclined ramp 9 which together with laterally projected portions 10 of the end walls 5 and 6 defines a feed hopper 11 leading to the inlet opening 8. The inlet opening 8 is further defined by a depending flange 12 integrally formed with the top wall 2 and depending therefrom. It may be assumed that the flange 12 extends transversely of the frame structure from the end wall 5 to the opposite end wall 6.

The bottom of the chamber 7 opens to atmosphere through a discharge opening 13 defined by downwardly converging side walls 14 and 15 and end walls 16. The upper end of the side wall 14 is connected to the intermediate portion of a downwardly sloping imperforate cake-supporting platform which is supported at its opposite ends by angle irons or the like 18 rigidly secured to the end walls 5 and 6 of the frame structure 1. As shown in Fig. 2, the platform 17 forms a continuation of the ramp 9 and terminates with the lower edge portion thereof disposed above the discharge opening 13 and is adapted to support a brick or cake of cracklings, shown by dotted lines in Fig. 2 and indicated by the letter X.

A rotor 19 extends transversely of the chamber 7 and is horizontally disposed therein in overlying relationship to the discharge opening 13 and in laterally spaced relation to the inlet opening 8 and laterally spaced above the lower terminal portion of platform 17. The rotor 19 comprises a shaft 20 journalled in suitable bearings 21 rigidly secured to the opposite end walls 5 and 7, a pair of disc-like end plates 22 rigidly secured to the shaft 20 for common rotary movements therewith, a plurality, as shown 3, of circumferentially spaced axially extending supporting bars 23 rigidly secured at their opposite ends to the plates 22 with the longitudinal axes of the bars 23 disposed parallel to the longitudinal axis of the rotor 19. A plurality of breaker teeth 24a, 24b, 24c are rigidly but detachably secured to said bars 23. The rotor 19 is adapted to be coupled to a source of power by means of a pulley or the like 25 rigidly secured to the outer projected end 26 of the shaft 20 and an endless drive belt 27 running over the pulley 25 and a suitable drive pulley, not shown but which may be assumed to be coupled to a motor or engine also not shown. The teeth 24a, 24b, 24c each project radially outwardly from their respective mounting bars 23 and are provided with radially inwardly projecting studs 28 which extend through openings 29 in the bars 23 and are held in place by suitable locking nuts 30 screw-threaded on the studs 28. Preferably and as shown, note Fig. 5, the breaker teeth 24a, 24b, and 24c comprise a body portion having a transverse width measured axially of the rotor being less than the thickness thereof measured circumferentially of the rotor. Further the breaker teeth 24 are inclined and slope generally forwardly in the direction of rotary movement of the rotor 19 and at their outer ends are provided with hook-like cutting or breaking portions 31 which are bent forwardly substantially normal to the body portion and impinge upon and break up the bricks or cakes X as they move downwardly on the platform 17. As clearly shown in Fig. 1 and as diagrammatically shown by full and broken lines in Fig. 3, the teeth 24a, 24b and 24c on each bar 23 are in axially staggered relation to the teeth on the other bars 23 of the rotor. Also preferably and as shown, the bars 23 each support a single row of the circumferentially aligned breaker teeth 24a, 24b or 24c.

The platform 17 is provided along its lower edge portion with a plurality of stop members or pins 32 which project angularly outwardly therefrom in a direction radially of the rotor 19 with the longitudinal axes of pins 32 all in a common plane which substantially intersects the longitudinal axis of the rotor. With particular reference to Figs. 1 and 3, it will be seen that the stop pins 32 terminate in close space relationship to the supporting bars 23 and are in staggered relationship to the breaker teeth 24a, 24b and 24c and so situated with respect thereto that a plurality of teeth one tooth of each row of the teeth 24a, 24b and 24c progressively laterally pass between adjacent pairs of the stop members or pins 32.

The stop pins 32 being disposed in the area traversed by the breaker teeth 24a, 24b and 24c, said breaker teeth will engage a cake X of cracklings resting upon the platform 17 and against said stop pins 32. Rotation of the rotor 19 in a counterclockwise direction with respect to Fig. 2 and as indicated by arrows therein, will cause the teeth to break the cake up into relatively small chunks or granules Y which ultimately fall through the discharge opening 13 onto an endless conveyor belt or the like 33. The conveyor belt 33 is conventional in design and in itself does not comprise the instant invention. However, it will be seen, with reference to Figs. 1 and 2, that the conveyor belt runs over a spool or drum 34 journalled for rotation in one end of a frame 35, and a plurality of intermediate supporting rollers 36 also journalled for rotation in the frame 35. The conveyor may be driven by any suitable means, not shown. The conveyor may be assumed to deliver the reduced chunks or granules Y to a reducing mill or other suitable point of delivery for further processing, storage, or the like.

Inasmuch as the rotor 19 revolves at realtively high speed, it tends to carry some of the chunks or granules Y circumferentially, eventually throwing said chunks against the side wall 4, the top wall 2, and in the general direction of the inlet opening 8. For preventing said chunks from being thrown outwardly through the discharge opening 8, I provide a guard element in the nature of a plate 37 which is hinged along its upper edge to the top wall 2, as indicated at 38. The hinge 38 is located closely adjacent the depending flange 12 so that the flange 12 engages the guard element 37 and acts as stop means to limit swinging movements of the guard element in one direction. Said guard element 37 is gravity biased toward a normal position, as shown by full lines in Fig. 2, wherein it partially closes the opening 8, from which position it may be swung inwardly to permit entry of a cake X of greater thickness than that shown. The granules or chunks Y which may be thrown tangentially from the teeth 24 during rotation of the rotor 19 in the direction of the inlet opening 8 will impinge against the guard element 37 and be prevented thereby from outward movement through the inlet opening.

The stop pins 32, like the breaker teeth 24 being releasably secured in place, the same may be easily detached for replacement or repair when replacement is needed.

My invention has been thoroughly tested and found to be completely satisfactory for the accomplishment of the objectives set forth; and while I have shown and described a commercial embodiment of my novel rotary cake breaker, it will be understood that the same is capable of modification without departure from the spirit and scope of the invention, as defined in the claim.

What I claim is:

In a cake breaker including a structure comprising an enclosed chamber having an upper inlet and a bottom discharge, an inclined ramp forming an imperforate cake-supporting platform sloping downwardly from the inlet and disposed within said chamber with the lower terminal portion thereof above the discharge, a rotor journaled in the chamber, said rotor being horizontally disposed and extending transversely of said chamber with the longitudinal axis thereof in overlying relationship to the discharge and to one side of said inlet and laterally spaced above the lower terminal portion of the cake-supporting platform, said rotor comprising a pair of axially spaced disc-like end plates and a plurality of circumferentially spaced axially extending supporting bars rigidly secured at their opposite ends to said plates with the longitudinal axes of the bars parallel to the longitudinal axis of the rotor, a plurality of axially spaced breaker teeth secured to each bar in circumferentially aligned rows with the breaker teeth of each row being axially offset in staggered relation to the breaker teeth of the other rows, said breaker teeth each comprising a generally radially extending body portion with the transverse width thereof measured axially of the rotor being less than the thickness thereof measured circumferentially of the rotor, said body portion of each tooth being disposed on said bars in a forwardly sloping inclined position with respect to a radius of the rotor in the direction of rotary movement thereof and terminating in a sharp tip which is bent forwardly substantially normal to said body portion in said direction of rotary movement providing a hook-like cutting or breaking element, a plurality of fixed laterally spaced stop pins projecting substantially normally outwardly from the lower terminal portion of the cake-supporting platform and having their longitudinal axes in a common plane substantially intersecting the longitudinal axis of the rotor and terminating in close space relationship to said supporting bars, the breaker teeth of said rows being arranged with respect to said stop pins and passing therebetween upon rotation of said rotor, said axial offset of the teeth of each row providing a plurality of axially offset circumferentially spaced teeth to pass between adjacent stop pins so that the teeth contacting a supported cake between adjacent pins varies progressively laterally as each row of teeth make contact with the cake and such variation extends progressively laterally from one adjacent pin to the other during one complete revolution of the rotor.

References Cited in the file of this patent

UNITED STATES PATENTS

| | | |
|---|---|---|
| 704,801 | Hilbert | July 15, 1902 |
| 712,637 | Beenk et al. | Nov. 4, 1902 |
| 850,093 | Mills | Apr. 9, 1907 |
| 1,440,429 | Williams | Jan. 2, 1923 |
| 2,264,049 | Miller | Nov. 25, 1941 |
| 2,275,121 | Wingate | Mar. 3, 1942 |
| 2,353,836 | Lindig | July 18, 1944 |
| 2,400,263 | Rusch | May 14, 1946 |
| 2,472,188 | Bennett | June 7, 1949 |
| 2,478,733 | Wright | Aug. 9, 1949 |
| 2,558,530 | Wimperis | June 26, 1951 |
| 2,588,741 | Matthiesen | Mar. 11, 1952 |
| 2,643,065 | Clawson | June 23, 1953 |

FOREIGN PATENTS

| | | |
|---|---|---|
| 98,053 | Sweden | Feb. 18, 1938 |
| 203,889 | Switzerland | Oct. 16, 1939 |
| 468,500 | France | Apr. 25, 1914 |
| 869,102 | France | Oct. 29, 1941 |